(12) United States Patent
Kozdras et al.

(10) Patent No.: US 10,400,611 B2
(45) Date of Patent: Sep. 3, 2019

(54) BLADE, SHROUD AND TURBOMACHINE

(71) Applicant: MTU Aero Engines AG, Munich (DE)

(72) Inventors: Marcin Kozdras, Krosno (PL); Krzysztof Skura, Majdan Korlewski (PL); Piotr Lebiedowicz, Hrubieszow (PL); Marek Szponar, Ksiezpol (PL)

(73) Assignee: MTU AERO ENGINES AG, Munich (DE)

( * ) Notice: Subject to any disclaimer, the term of this patent is extended or adjusted under 35 U.S.C. 154(b) by 779 days.

(21) Appl. No.: 15/008,742

(22) Filed: Jan. 28, 2016

(65) Prior Publication Data
US 2016/0237829 A1 Aug. 18, 2016

(30) Foreign Application Priority Data

Feb. 12, 2015 (EP) .................... 15154834.4

(51) Int. Cl.
*F01D 5/22* (2006.01)
*F01D 5/20* (2006.01)
*F01D 5/14* (2006.01)
*F04D 29/08* (2006.01)
*F04D 29/38* (2006.01)

(52) U.S. Cl.
CPC ............. *F01D 5/225* (2013.01); *F01D 5/147* (2013.01); *F01D 5/20* (2013.01); *F04D 29/083* (2013.01); *F04D 29/388* (2013.01); *Y02T 50/671* (2013.01)

(58) Field of Classification Search
None
See application file for complete search history.

(56) References Cited

U.S. PATENT DOCUMENTS

| 5,083,903 | A | * | 1/1992 | Erdmann | F01D 5/147 29/889.7 |
|---|---|---|---|---|---|
| 7,527,477 | B2 | | 5/2009 | Shaffer | |
| 9,103,218 | B2 | | 8/2015 | Pikul et al. | |
| 9,303,816 | B1 | | 4/2016 | Collin et al. | |
| 9,322,281 | B2 | | 4/2016 | Schlemmer et al. | |
| 10,087,765 | B2 | * | 10/2018 | Balliel | F01D 5/20 |
| 2008/0025841 | A1 | | 1/2008 | Norton et al. | |
| 2012/0003078 | A1 | | 1/2012 | Pikul et al. | |
| 2012/0107123 | A1 | | 5/2012 | Schlemmer et al. | |
| 2013/0259699 | A1 | | 10/2013 | Collin | |
| 2015/0017003 | A1 | | 1/2015 | Shaffer | |
| 2015/0023793 | A1 | | 1/2015 | Bensalah et al. | |

FOREIGN PATENT DOCUMENTS

| DE | 102009030566 A1 | 12/2010 |
|---|---|---|
| EP | 1890008 A2 | 2/2008 |
| EP | 2402559 A1 | 1/2012 |
| JP | 2005207294 A | 8/2005 |
| WO | 2013107982 A1 | 7/2013 |
| WO | 2014137479 A1 | 9/2014 |

\* cited by examiner

*Primary Examiner* — Kayla Mccaffrey
(74) *Attorney, Agent, or Firm* — Abel Schillinger, LLP

(57) ABSTRACT

The invention relates to a blade for a turbomachine a shroud for such a blade, and a turbomachine having at least one such blade. The blade comprises a shroud which is positioned on the blade tip side of the blade and is stiffened in the region of its surface by means of a stiffening structure having at least one longitudinal stiffening element such as a rib. The height of the longitudinal stiffening element varies in the circumferential direction.

16 Claims, 2 Drawing Sheets

BLADE, SHROUD AND TURBOMACHINE

CROSS-REFERENCE TO RELATED APPLICATIONS

The present application claims priority under 35 U.S.C. § 119 of European Patent Application No. 15154834.4, filed Feb. 12, 2015, the entire disclosure of which is expressly incorporated by reference herein.

BACKGROUND OF THE INVENTION

1. Field of the Invention

The invention relates to a blade for a turbomachine, to a shroud and to a turbomachine.

2. Discussion of Background Information

Blades of turbomachines such as gas turbines, aero engines, steam turbines and the like frequently have on their blade tips a shroud or what is referred to as an outer shroud. In the installed state of the blades, the shrouds bear against one another. By virtue of the mutual bearing, the blades are supported on the blade tip side or radially outwards with respect to an axis of rotation of the rotor, which has a vibration-damping effect. In addition, the shrouds counteract flow around the outside of the blades. In order to avoid deformations of the rather thin-walled shrouds due to high thermal and mechanical loads, these are frequently stiffened by means of a stiffening structure in the region of their surface. A fundamental increase in the thickness of the shrouds over their entire cross section can for example make it possible for disadvantageous thermal stresses to be introduced into the shrouds. An alternative measure therefore provides, for the purpose of stiffening the shrouds, to provide, on the side of the outer face or on the side of the upper face, a stiffening structure with ribs arranged in the shape of a cross with respect to one another. A shroud stiffened in this manner is for example shown in DE 10 2009 030 566 A1, the entire disclosure of which is incorporated by reference herein. Other known outer shrouds or blades of turbo machines with outer shrouds are for example shown in WO 2013/107982 A1, JP 2005207294 A and in EP 2 402 559 A1, the entire disclosures of which are incorporated by reference herein.

It would be advantageous to have available a blade for a turbomachine whose outer shroud is capable of withstanding high loads while having reduced weight. It further would be advantageous to have available a lightweight and highly loadable shroud for such a blade and a turbomachine having an optimized rotor vibration behavior.

SUMMARY OF THE INVENTION

The present invention provides a blade for a turbomachine. The blade comprises a shroud which is positioned on a blade tip side of the blade and is stiffened in a region of its surface by a stiffening structure comprising at least one rib. The height of the rib varies in the circumferential direction.

In one aspect of the blade, the rib may comprise both at least one section of varying height and at least one section of essentially constant height. In another aspect, the height of the rib may vary over its entire length.

In another aspect of the blade, the rib may comprise a highest section which is located in an extension of the blade airfoil.

In yet another aspect of the blade of the present invention, the rib may have a varying thickness.

In a still further aspect, the rib may transition into rim-side raised portions of the stiffening structure, which portions are positioned obliquely with respect to the rib. For example, the rib may transition into the raised portions in a step-free manner.

In another aspect of the blade, the shroud may comprise at least one sealing web extending in circumferential direction and having a varying thickness and/or a varying transition radius to the shroud.

The present invention further provides a shroud for a blade, wherein the shroud is suitable for being positioned on a blade tip side of the blade and is stiffened in a region of its surface by a stiffening structure comprising at least one rib, a height of the rib varying in circumferential direction.

The present invention further provides a turbomachine which comprises a multiplicity of blades according to the present invention as set forth above, including the various aspects thereof.

An inventive blade, in particular rotor blade, for a turbomachine, such as a static gas turbine, an aero engine or the like, comprises a shroud, in particular an outer shroud, which is positioned on the blade tip side of the blade and is stiffened in the region of its surface, in particular its outer surface, by means of a stiffening structure. The stiffening structure has at least one rib. According to the invention, the height of the at least one rib varies in the circumferential direction.

By virtue of the varying height of the rib in the circumferential direction, the shroud can be optimally stiffened since the loading acting on the shroud can be considered almost punctually. This allows the entire structure of the shroud to be designed as a lightweight construction with optimized weight distribution, which lends the shroud high load-bearing properties.

In the context of the present invention, "variable height of the rib in the circumferential direction" is to be understood as meaning that the radial distance of the radially outer surface of the rib with respect to the axis of rotation of the turbomachine varies in the circumferential direction. By contrast, the radially inward-oriented surface of the shroud, which is connected to the blade airfoil, has essentially everywhere, preferably in the region of the rib and along the circumferential direction, the same radial distance with respect to the axis of rotation of the turbomachine, wherein the transition from shroud to blade airfoil can be provided with a constant or variable transition radius.

In accordance with the present invention, the stiffening structure is not to be understood as a sealing rib, i.e. a structure which, when the rotor blade is properly installed, is designed to engage with a stator-side sealing element such as for example a honeycomb in order to increase the seal between the rotor blade tip and the stator structure surrounding the latter. Where the shroud of the inventive blade furthermore also has at least one sealing rib, this at least one sealing rib will generally have a larger radial distance with respect to the axis of rotation of the turbomachine than the largest radial distance of the outer surface of the rib with respect to the axis of rotation.

In one exemplary embodiment, the at least one rib has both at least one section of varying height and at least one section of essentially or exactly constant height. This requires the rib to be raised only in certain sections, which is advantageous in terms of manufacturing.

In one alternative exemplary embodiment, the height of the at least one rib varies over its entire length. This permits the greatest possible variability of the rib with respect to its height.

In one preferred exemplary embodiment, the at least one rib has a highest section which is located in the radial extension of the blade airfoil. By virtue of this measure, raising the rib increases the weight of the shroud in that region in which the shroud is connected to the blade airfoil. Unequal mass distributions of the shroud in relation to its connection region, which could introduce stresses into the shroud itself and into the blade airfoil, can thus be prevented.

In order to further increase the variability of the stiffening structure, the at least one rib can have a varying thickness.

The stiffening structure is preferably essentially Z-shaped, or essentially "in the shape of a dogbone". The Z-shaped or dogbone-shaped design permits a high degree of stiffening in both the circumferential direction and the axial direction. To that end, the at least one rib can transition into raised portions of the stiffening structure on the side region side or close to the contact face, which portions are positioned obliquely with respect to the rib, so as to result in an approximately Z-shaped design in plan view.

Preferably, the shroud has an essentially Z-shaped design on its circumferential rims with which, in the installed state, the shroud is in contact with circumferentially adjacent shrouds. Reference is thus also made to what are termed "Z-notches". With the aid of this design, it is possible to achieve clamping between the shrouds of circumferentially adjacent blades and thus the damping effect, mentioned in the introduction, between these blades. The raised portions of the stiffening structure on the side region side or close to the contact face preferably extend in each case over the entire central region of the Z shape of the shroud, i.e. over the central leg of the Z shape. More preferably, these raised portions extend essentially, i.e. plus at most 15%, exclusively in the central region of the Z shape.

In order to achieve a load-oriented transition of the at least one rib into the raised portions, it is advantageous if the rib transitions into the raised portions in a step-free manner. The raised portions themselves can be of constant height or of varying height. It is for example conceivable to embody the raised portions in the manner of a plateau or let them taper off in the form of a wedge.

In one exemplary embodiment, the shroud has at least one sealing web extending in the circumferential direction and having a varying thickness and/or a varying transition radius to the shroud. This turns the sealing web into a quasi-stiffening element in addition to its sealing function, such that it also contributes to the optimized stiffening of the shroud. The thickened portion can be on one side or on both sides of the longitudinal axis of the sealing web. In order to even out the mass distribution, it is advantageous if the thickened portion is located centrally or approximately centrally in the sealing web.

A preferred shroud for an inventive blade has, in the region of its surface, a stiffening structure for stiffening, having at least one rib whose height varies in the circumferential direction. Such a shroud is characterized, in comparison to known shrouds, by improved load-bearing capacity while having reduced weight.

A preferred turbomachine has a multiplicity of blades according to the invention. In particular, the blades form at least one blade row which, due to their optimized vibration behavior, has a positive effect on the vibration behavior of the machine rotor.

BRIEF DESCRIPTION OF THE DRAWINGS

An exemplary embodiment of the invention will be explained in greater detail below with reference to schematic illustrations, in which.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
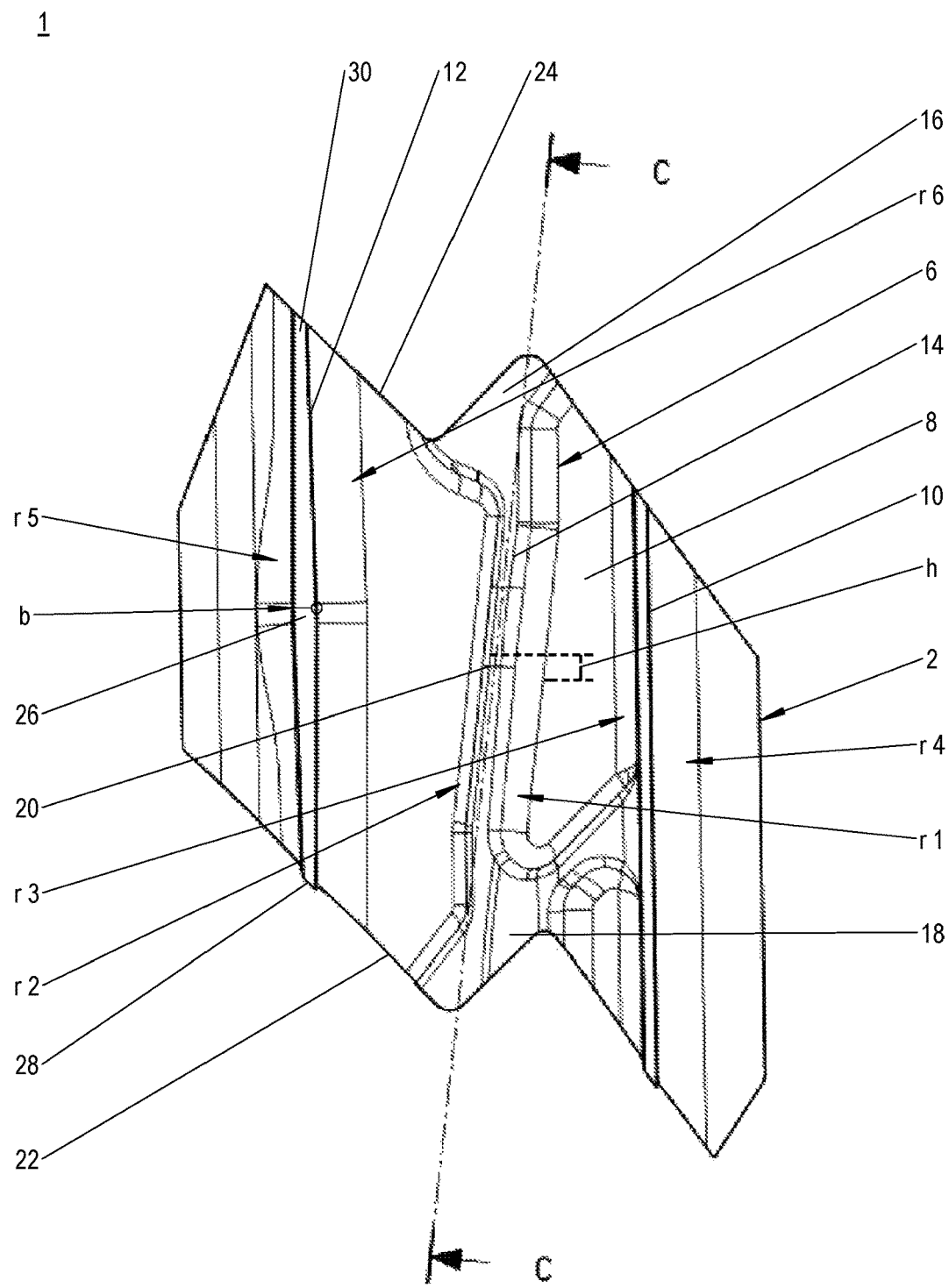
FIG. 1 is a plan view of an inventive blade in the region of its outer shroud.

FIG. 1 shows a plan view of an inventive blade 1 of a turbomachine such as an aero engine. The blade 1 is for example a rotor blade and, together with a multiplicity of identical rotor blades, forms a blade row of a rotor of the turbomachine. In particular, FIG. 1 shows a plan view of an inventive shroud 2 of the blade 1. The shroud 2 is arranged on the tip side of a blade airfoil 4, indicated in FIG. 2, and is accordingly what is referred to as an outer shroud. It is in the form of a plate, or thin-walled, and is stiffened by means of a stiffening structure 6 that extends over a surface 8 of the shroud 2 oriented away from the blade airfoil 4, between the two sealing webs 10, 12 of the shroud. In the exemplary embodiment shown, the stiffening structure 6 has a rib 14 and two raised portions 16, 18.

Figure 2:
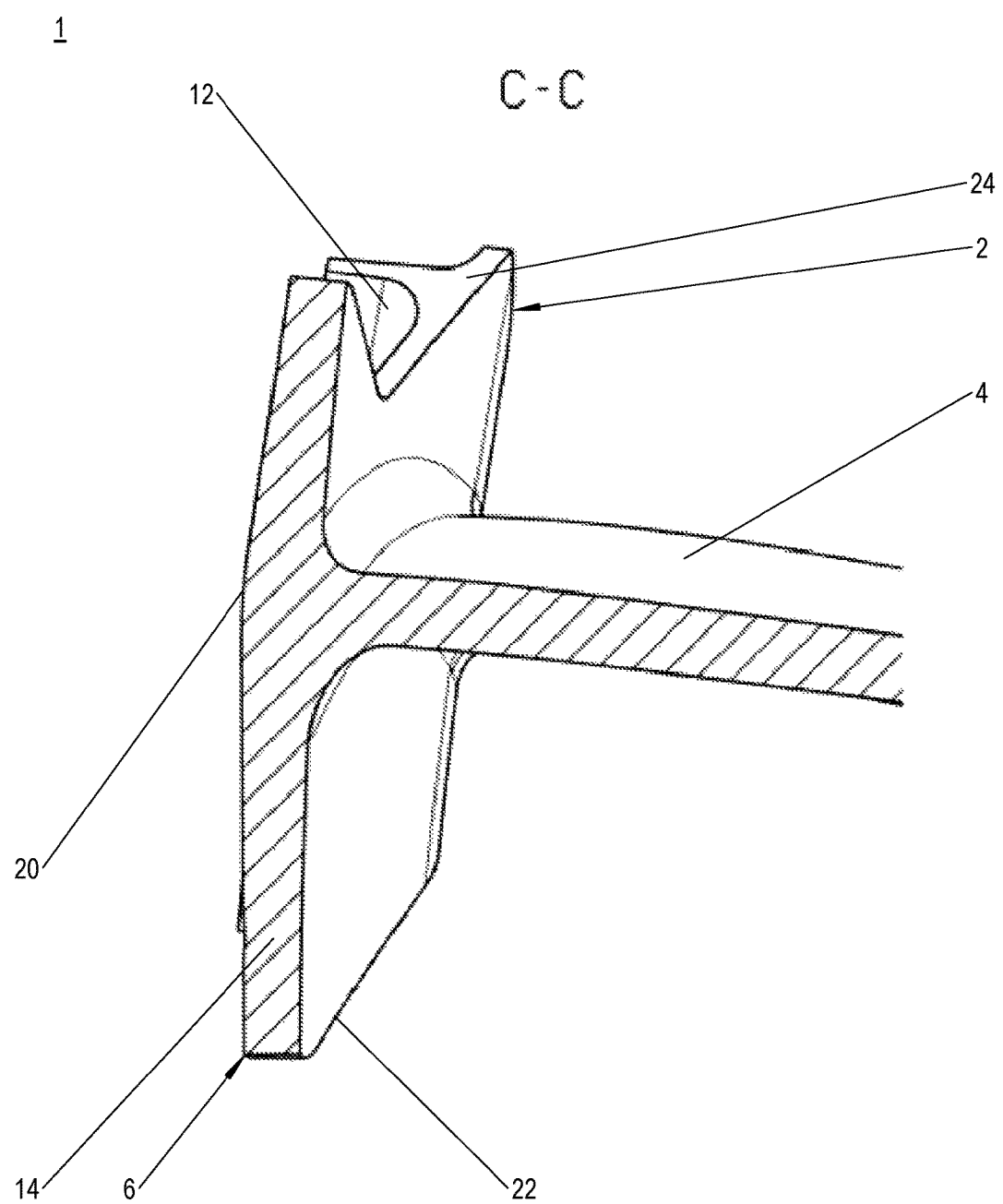
FIG. 2 shows a section through the outer shroud along the line of section C-C.

The rib 14 extends in the circumferential direction or approximately in the circumferential direction, with respect to the blade row or to an axis of rotation of the rotor, and transitions at its end sides into the raised portions 16, 18. In the plan view shown in FIG. 1, the circumferential direction runs perpendicular or approximately parallel to the line of section C-C. The at least one rib 14 has a web-like design with, here, a constant thickness or breadth and a varying height h in the circumferential direction. As shown in FIG. 2, the height h of the rib 14 varies over its entire length, its highest section 20 being arranged in the radial extension of the blade airfoil 4. As seen from the highest section 20, the rib 14 runs straight or in the manner of a wedge in the direction of the raised portions 16, 18. As seen from the raised portions 16, 18, the height h of the rib 14 increases constantly in the direction of its highest section 20. Transition radii r1, r2 from the rib 14 into the surface 8 or from the surface 8 into the rib 14 are in this case constant over the length of the latter.

The raised portions 16, 18 of the stiffening structure 6 are arranged on the side of the side rims and form sections of contact faces 22 for bearing against shrouds of adjacent blades 1. They have an essentially constant and uniform height. The raised portions 16, 18 are essentially plinth- or plateau-shaped and are positioned obliquely with respect to the rib 14 so as to produce a Z-shaped or approximately Z-shaped design, as seen in plan view, of the stiffening structure 6. The stiffening structure 6 thus has what is referred to as a "dogbone-shaped design". Transition radii not provided with a reference numeral, from the raised portions 16, 18 into the surface 8 or from the surface 8 into the raised portions 16, 18, are identical to the transition radii r1, r2 of the rib 14, such that in this case the raised portions 16, 18 and the rib 14 have the same transition radii r1, r2.

The sealing webs 10, 12 are oriented in the circumferential direction and, in operation, cut into stator-side sealing elements such as honeycomb segments. They extend from one contact face 22 to the opposite contact face 24 and thus in the circumferential direction over the entire shroud 2.

The right-hand sealing web 10 shown in FIG. 1, or rear sealing web as seen in the flow direction of a primary flow of the turbomachine, has, over its entire length, a constant height, a constant breadth and constant transition radii r3, r4. The transition radius r4 oriented away from the rib 14 is in this case larger than that transition radius r3 of the rear sealing web 10 which is oriented toward the rib 14.

The left-hand sealing web 12 shown in FIG. 1, or forward sealing web as seen in the flow direction, has, for a constant height over its length, a varying breadth b and at least one transition radius r5 which varies over its length. It has a thickened portion 26 approximately halfway along its length or at the center of the shroud 2. The thickened portion of the forward sealing web 12 is in this case formed symmetrically with respect to its longitudinal axis and thus of identical shape on both sides. As seen from its end sections 28, 30 toward the thickened portion 26, the breadth b increases continuously. In addition, in the region of the thickened portion 26, the transition radius r5 oriented away from the rib 14 is larger than adjacent transitions. A transition radius r6, oriented toward the rib 14, of the forward sealing web 12 is constant. It is identical or approximately identical to that transition radius r4 of the rear sealing web 10 which is oriented away from the rib 14. In principle, the rear sealing web 10 can also be formed with a thickened portion 26 and/or the forward sealing web 12 with a constant breadth b.

Non-numbered pockets between the rib 14, the raised portions 16, 18 and the sealing webs 10, 12 are open radially outward over their entire base area and laterally to the contact faces 22, 24. In the exemplary embodiment shown here, three pockets are formed, wherein the pocket extending along the forward sealing web 12 runs from one contact face 22 to the other contact face 24. The other two pockets, extending along the rear sealing web 10, are separated from one another by the raised portion 16 or by an arm (not numbered) transitioning into the rear sealing web 10.

The invention provides a turbomachine blade having a shroud or outer shroud 2 or an outer shroud 2 for a blade of a turbomachine, whose stiffening structure 6, as seen in the circumferential direction, is low in the region of the contact faces 22, 24 and high in an intermediate region. Thus, the weight of the shroud 2 is reduced in its lateral overhang regions, and is concentrated in a central region, which has an advantageous effect on the mechanical and thermal load-bearing capacity of the shroud 2 and, correspondingly, of the blade 1. In that context, at least the forward sealing web 12 acts, in addition to its sealing function, by means of the thickened portion 26 and the varying profile of the transition radius r5, as part of the stiffening structure 6 and thus as a quasi-stiffening element.

What is disclosed is a blade for a turbomachine, having an outer shroud which is positioned on the blade tip side of the blade and is stiffened in the region of its surface oriented away from the annular space by means of a stiffening structure having at least one longitudinal stiffening element such as a rib, wherein the height of the longitudinal stiffening element varies in the circumferential direction, an outer shroud for such a blade, and a turbomachine having at least one such blade.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Blade
2 Shroud/outer shroud
4 Blade airfoil
6 Stiffening structure
8 Surface
10 Sealing web
12 Sealing web
14 Rib
16 Raised portion
18 Raised portion
20 Highest section
22 Contact face
24 Contact face
26 Thickened portion
28 End section
30 End section
h Height of the rib
b Breadth of the forward sealing web
r1 Transition radius of the rib
r2 Transition radius of the rib
r3 Transition radius of the rear sealing web
r4 Transition radius of the rear sealing web
r5 Transition radius of the forward sealing web
r6 Transition radius of the forward sealing web

What is claimed is:

1. A blade for a turbomachine, wherein the blade comprises a shroud which is positioned on a blade tip side of the blade and is stiffened in a region of the shroud surface by a stiffening structure comprising at least one rib, and wherein a height of the at least one rib varies in circumferential direction and the at least one rib comprises a highest section which is located in an extension of a blade airfoil.

2. The blade of claim 1, wherein the at least one rib comprises both at least one section of varying height and at least one section of essentially constant height.

3. The blade of claim 2, wherein the at least one rib has a varying thickness.

4. The blade of claim 3, wherein the shroud comprises at least one sealing web extending in circumferential direction and having a varying thickness and/or a varying transition radius to the shroud.

5. The blade of claim 2, wherein the shroud comprises at least one sealing web extending in circumferential direction and having a varying thickness and/or a varying transition radius to the shroud.

6. The blade of claim 1, wherein the height of the at least one rib varies over its entire length.

7. The blade of claim 6, wherein the at least one rib has a varying thickness.

8. The blade of claim 7, wherein the shroud comprises at least one sealing web extending in circumferential direction and having a varying thickness and/or a varying transition radius to the shroud.

9. The blade of claim 6, wherein the shroud comprises at least one sealing web extending in circumferential direction and having a varying thickness and/or a varying transition radius to the shroud.

10. The blade of claim 1, wherein the at least one rib has a varying thickness.

11. The blade of claim 10, wherein the shroud comprises at least one sealing web extending in circumferential direction and having a varying thickness and/or a varying transition radius to the shroud.

12. The blade of claim 1, wherein the at least one rib transitions into rim-side raised portions of the stiffening structure, which portions are positioned obliquely with respect to the at least one rib.

13. The blade of claim 12, wherein the at least one rib transitions into the raised portions in a step-free manner.

14. The blade of claim 1, wherein the shroud comprises at least one sealing web extending in circumferential direction and having a varying thickness and/or a varying transition radius to the shroud.

15. A turbomachine, wherein the turbomachine comprises a multiplicity of blades according to claim 1.

16. A shroud for a blade, wherein the shroud is configured for being positioned on a blade tip side of the blade and is stiffened in a region of the shroud surface by a stiffening structure comprising at least one rib, a height of the at least one rib varying in circumferential direction and the at least one rib comprising a highest section which is located in an extension of a blade airfoil when the shroud is present on the blade.

* * * * *